Oct. 11, 1932.　　　　H. HULL　　　　1,881,604

FARM TOOL

Filed Nov. 10, 1930

Inventor
HIRAM HULL

By
Irving L. M. Cathran　Attorney

Patented Oct. 11, 1932

1,881,604

UNITED STATES PATENT OFFICE

HIRAM HULL, OF BROOKSVILLE, FLORIDA

FARM TOOL

Application filed November 10, 1930. Serial No. 494,747.

This invention appertains to tools and more particularly to an improved hand tool for general utility work around a farm.

One of the primary objects of my invention is to provide a hand tool which is particularly adapted for weeding purposes and for working around growing plants, and which has many advantages over the ordinary type of hoe, the tool embodying an elongated narrow blade having cutting edges on the opposite sides thereof and a front leading cutting edge, with a rearwardly and angularly extending handle, the blade permitting the cutting of the weeds by lateral swinging of the blade, the side edges being brought into play in certain instances, and by forward motion of the blade, the front cutting edge being used in certain instances.

Another important object of my invention is the provision of a hand tool embodying an elongated narrow blade gradually tapering toward the front leading edge thereof, said edge being of arcuate shape and beveled downwardly from the top face of the blade, the side edges of the blade being beveled upwardly from the under face of the blade to provide side cutting edges, the blade being dished transversely from its side edges to the longitudinal center and from the front edge to the rear of the blade.

A further important object of my invention is to provide a hand tool so formed as to be particularly useful in weeding, working around growing plants, in irrigating work taking the place of a shovel in opening up and repairing ditches, for working around the edges of walks, and walls, and for pruning or trimming off the lower branches of small trees when clearing out underbrush.

A still further important object of my invention is to provide an improved hand tool for general utility work around a farm, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:—

Referring to the drawing in detail, wherein similar reference characters designate corresponding parts throughout the several views, the letter A generally indicates my improved tool, which comprises a blade B, and a handle H.

Figure 1:
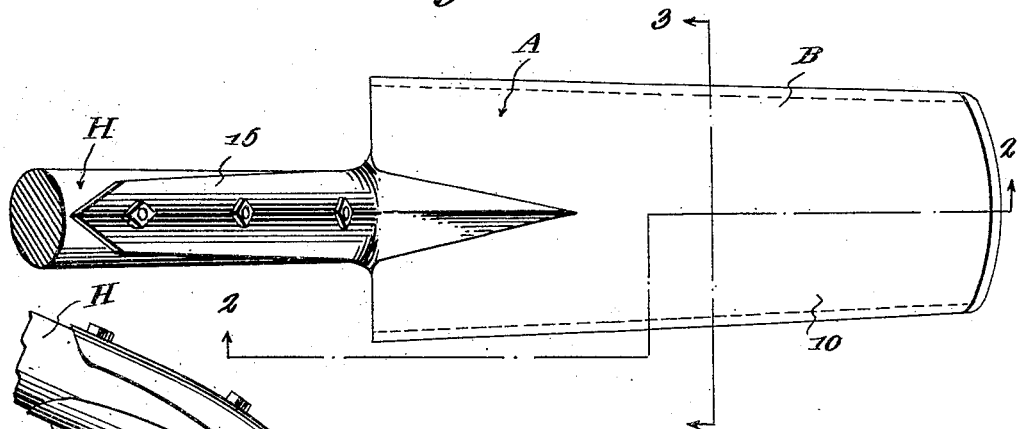
Figure 1 is a top plan view of the blade of my improved tool.

The blade B is preferably formed from a good quality of steel and is of a narrow elongated form, the same consisting of a body 10 preferably having a length of substantially fourteen inches and a width at its rear end of five inches. The blade gradually tapers toward its front leading edge so that the blade will be approximately four inches wide at the front thereof. This front leading edge is preferably of arcuate form and is beveled downwardly from the top face of the body as at 11, to provide a cutting leading edge 12. The sides of the blade are beveled upwardly from the lower face of the blade as at 13 to provide side cutting edges 14. The body is also dished or of a substantially concavo-convex form, and as shown, the body flares upwardly from its longitudinal center toward the side cutting edges 14 and the blade is also dished from the front to the rear, as clearly shown in the drawing.

The rear end of the blade B can be provided with any preferred type of socket 15 for receiving the handle H, which can be made of wood or the like.

Figure 2:
Figure 2 is a fragmentary side elevation of my improved tool showing parts of the blade broken away and in section.
Figure 4:
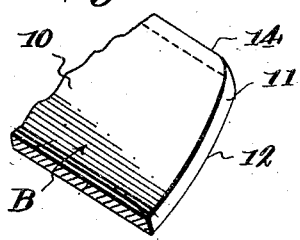
Figure 4 is an enlarged detail fragmentary perspective view of the forward end of the blade illustrating the bevel of the front cutting edge.
Figure 3:
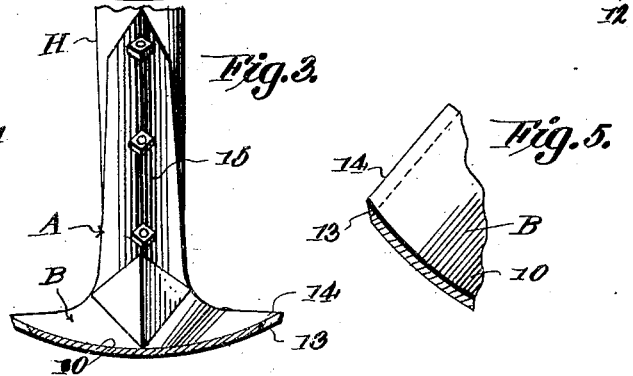
Figure 3 is a transverse section through the blade taken on the line 3—3 of Figure 1 looking in the direction of the arrows.
Figure 5:
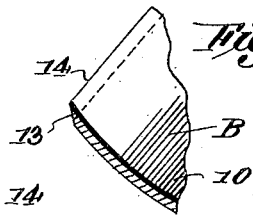
Figure 5 is an enlarged fragmentary detail perspective view of one side of the blade illustrating the bevel of one side cutting edge thereof.

This handle and socket are so shaped and put together that when the blade of a fourteen inch by five inch implement is put flat on the ground, the end of a four foot handle is about thirty four inches above the ground and the implement swings with a free cutting movement. Thus it can be seen by referring to Figure 2 of the drawing that the handle extends at an acute angle from the rear edge of the blade B.

Figure 7:
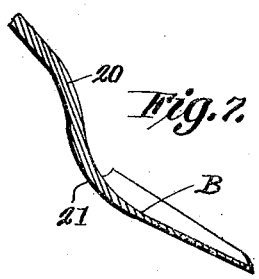
Figure 7 is a longitudinal section through the improved tool illustrating a modified form of handle therefor.
Figure 6:
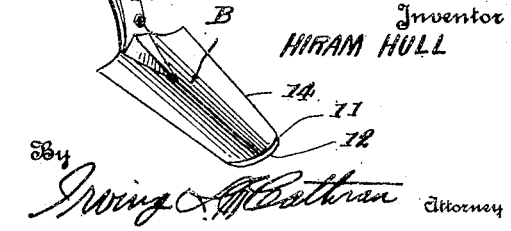
Figure 6 is a perspective view of the complete tool with the handle thereof broken away.

It is to be understood that the handle H does not necessarily have to be made of wood and in fact, this handle can be made integral with the blade as shown in Figure 7 of the drawing. In this view the handle is indicated by the reference character 20 and is integrally formed with the rear edge of the blade as indicated by the reference character 21.

I have found, that in actual use my tool is superior to the ordinary type of hoe for working around plants and for weeding purposes, and that the tool is especially useful in working around walks, and walls, and can also be used in opening irrigating ditches and the like. Further the tool can be used for cutting low branches of trees, bushes and the like.

The tool can either be used by swinging the same from side to side bringing the side cutting edges 14 into play or by a forward downward motion bringing the front cutting edge 12 into play.

Changes in details may be made without departing from the spirit or the scope of this invention, but:—

What I claim as new is:

As a new article of manufacture, a hand tool comprising a narrow elongated blade tapering toward the front end thereof and provided with a gradually curved forward end curving from the center rearwardly toward the side edges of the blade, said blade being beveled upon its underface near the side edges to provide a sharp cutting edge along the top side edge of the blade and being beveled upon its top front edge to provide a sharp cutting edge along the bottom front edge of the blade, the blade being curved transversely from its longitudinal center toward the side edges for elevating the side edges of the blade and said blade curved longitudinally from the front edge to the rear edge thereof.

In testimony whereof I affix my signature.

HIRAM HULL.